United States Patent Office 3,427,353
Patented Feb. 11, 1969

---

3,427,353
BICYCLO[3.3.2]DECANE AMINES
Alfred W. Chow, Radnor, Pa., assignor to Smith Kline & French Laboratories, Philadelphia, Pa., a corporation of Pennsylvania
No Drawing. Filed May 12, 1966, Ser. No. 549,496
U.S. Cl. 260—563                                    10 Claims
Int. Cl. C07c 87/40, 85/00

This invention relates to bicycloalkylamine compounds having antiviral activity. In particular, the invention relates to bicyclo[3.3.2]decanes substituted at the 1, 2, 3, or 9 positions with an amino, a methylamino, a dimethylamino, an aminomethyl, or a 1-aminoethyl group.

The compounds of the invention are represented by the following structural formula:

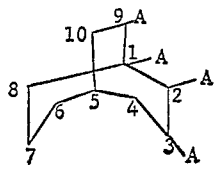

where one A group is $NH_2$, $NHCH_3$, $N(CH_3)_2$,

or $CH_2NH_2$, and the other A groups are hydrogen.

The compounds of the invention are prepared as follows. 1-aminobicyclo[3.3.2]decane is prepared by reducing bicyclo[3.3.1]nonane-1-carboxylic acid with lithium aluminum hydride to give the 1-hydroxymethyl compound. This compound is then converted to the ring-enlarged bicyclo[3.3.2]decane-1-carboxylic acid with a mixture of 98–100% formic acid and conc. sulfuric acid. The acid is converted to the amine by means of a Schmidt reaction with sodium azide and sulfuric acid. The 1-(1-aminoethyl) compound

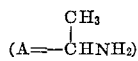

is prepared by treating the 1-carboxylic acid with methyl lithium to give the methyl ketone, forming the oxime with hydroxylamine, and reducing the oxime with lithium aluminum hydride or catalytically. The carboxylic acid is also converted to an aminomethyl compound (A=—$CH_2NH_2$) by treatment with thionyl chloride, conversion of the resulting acid chloride to the amide with aqueous or gaseous ammonia, and reduction of the amide with lithium aluminum hydride. The bicyclo[3.3.1]nonane-1-carboxylic acid starting material is prepared by converting ethyl 9-oxobicyclo[3.3.1]nonane-1-carboxylate [J. Am. Chem. Soc. 73, 4702 (1951)] to its dithioketal with ethanedithiol, reductively eliminating the ketal function by Raney nickel desulfurization, and hydrolyzing the ester to the acid with base.

2-aminobicyclo[3.3.2]decane is prepared by carrying out a Ritter reaction (acetonitrile, conc. sulfuric acid) on 6 - hydroxymethylbicyclo[3.2.2]nonane [Chem. Ber. 89, 1972 (1956)] to give the ring-enlarged 2-acetamidobicyclo[3.3.2]decane. Acid hydrolysis gives the 2-amine. The 2-(1-aminoethyl) compound is prepared by diazotizing the 2-amine to give the 2-alcohol. The alcohol is condensed with methylmalonic acid in acetic acid to give a 2-(1,1-dicarboxyethyl) compound. Heating in pyridine results in monodecarboxylation, and the resulting 1-carboxyethyl compound is subjected to the Schmidt reaction to give the 2-(1-aminoethyl) product.

3-aminobicyclo[3.3.2]decane is prepared by first converting 3-hydroxybicyclo[3.3.2]decane [Chem. Ber. 89, 1972 (1956)] to its tosylate derivative. Treatment with sodium azide gives the intermediate azide, which is reduced with lithium aluminum hydride to give the 3-amine. The 3-(1-aminoethyl) compound is prepared by subjecting the starting 3-alcohol to the methylmalonic acid condensation, decarboxylation, and conversion to the amine as described above for the 2-isomer.

9-aminobicyclo[3.3.2]decane is prepared by first converting bicyclo[3.3.1]nonane-9-carboxylic acid [J. Org. Chem. 30, 1061 (1965)] to its amide via the acid chloride. Reduction of the amide with lithium aluminum hydride gives the 9-aminomethyl compound. Diazotization with nitrous acid, followed by steam distillation, gives the ring-enlarged 9-hydroxybicyclo[3.3.2]decane. The alcohol is tosylated, converted to the azide, and then reduced to the amine as described above. To prepare the 9-(1-aminoethyl) compound, the 9-alcohol is condensed with methylmalonic acid, the product is monodecarboxylated, and the monoacid is converted to the amine by the Schmidt reaction.

The above primary amino compounds are converted to their methyl analogs by reaction with a stoichiometric amount of methyl iodide in the presence of a base. They are converted to the dimethylamino compounds by heating the primary amine with 90% formic acid and 35% formaldehyde solution.

The 2, 3, and 9-aminomethyl compounds

are prepared by oxidizing the 2, 3, or 9-hydroxybicyclo[3.3.2]decane to the corresponding ketone. The ketone is then treated with methoxymethylene triphenylphosphorane, generated from methoxymethyl triphenylphosphonium chloride and butyl lithium in solvents such as tetrahydrofuran and diglyme. The resulting 2, 3, or 9-methoxymethylene compound is then converted to a carboxaldehyde by means of perchloric acid. The aldehyde is then treated with hydroxylamine hydrochloride to form an oxime, and the oxime is reduced to the aminomethyl compound with a reagent such as lithium aluminum hydride.

The basic amine compounds of the invention are converted to their pharmaceutically acceptable acid addition salts by adding such an acid, either as such or in the form of an alcoholic, ethereal, or acetone solution, to a solution of the amine compound. Such salts are considered part of the present invention. Among the pharmaceutically acceptable acids which may be used to form the salts are hydrochloric, hydrobromic, sulfuric, pamoic, nitric, acetic, cyclohexylsulfamic, and succinic.

Since the carbon atom to which the amino or aminomethyl substituent is attached in the 2-substituted bicyclo[3.3.2]decanes is asymmetric, it will be apparent that these product compounds exist in the form of racemic mixtures. The side chain of a 1-aminoethyl compound also bears an asymmetric carbon atom, thus resulting in the formation of racemates. Inasmuch as separation of racemic mixtures by various methods is known to the art of organic chemistry, the present invention is intended to embrace the racemic mixtures of these compounds as well as the separated optically active forms.

It will be apparent to one skilled in the art of medicinal chemistry that certain well-known derivatives and obvious variants can be prepared from the compounds of the invention without departing from the basic concept thereof. Such obvious derivatives and variants include formation of N-oxides and quaternary salts, and formation of N-acyl and N-alkyl derivatives of the primary amines. Such obvious compounds are all prepared by well-known methods and are considered the full equivalents of the basic compounds more fully described.

The antiviral compounds of the invention are active against influenza viruses. They are administered orally or subcutaneously, preferably as their acid addition salts in doses of 25–100 mg./kg. The preferred compound of the invention, 3-aminobicyclo[3.3.2]decane, is effective in mice infected with Asian influenza, when administered subcutaneously at a dose of 25 mg./kg. as a solution of the hydrochloride salt.

The following examples are intended to illustrate the preparation of the compounds of the invention, but are not intended to limit the scope thereof.

EXAMPLE 1

1-aminobicyclo[3.3.2]decane

A mixture of ethyl 9-oxobicyclo[3.3.1]nonane-1-carboxylate (30 g.), ethanedithiol (60 ml.), and freshly distilled boron trifluoride etherate (10 ml.) is allowed to stand 18 hours at room temperature. The mixture is diluted with 300 ml. of ether, and then washed with water, aqueous sodium bicarbonate solution, and again with water.

The crude cyclic ethylenedithioketal remaining after distilling off the ether and excess ethanedithiol is dissolved in 200 ml. of absolute ethanol, 300 g. of Raney nickel is added, and the mixture is heated at reflux with stirring for 24 hours. An additional 300 g. of Raney nickel is added and the mixture heated at reflux for another 24 hours. The mixture is filtered, the nickel washed with ethanol and the filtrate distilled in vacuo to give ethyl bicyclo[3.3.1]nonane-1-carboxylate, B.P. 58–61°/3 mm.

The above ester (7.6 g.) is heated in a refluxing solution of 60 ml. of methanol and 60 ml. of water containing 12 g. of potassium hydroxide for 24 hours. Methanol is removed by heating in vacuo, and the aqueous concentrate extracted with ether and then acidified with dilute hydrochloric acid. The thick white precipitate is removed from the aqueous layer by extraction with ether. Evaporation of the combined dry ether extracts gives crude white acid. The acid is purified by vacuum sublimation followed by recrystallization from methanol-water; M.P. 95.5–97°.

To a stirred suspension of 4.55 g. (0.12 mole) of lithium aluminum hydride in 500 ml. of anhydrous ether is added dropwise a solution of 16.8 g. (0.1 mole) of the above acid in 100 ml. of anhydrous ether. A slight evolution of heat occurs. The mixture is stirred at room temperature for 4 hours and then worked up in conventional manner to give 1-hydroxymethylbicyclo[3.3.1]nonane as an oil. A solution of 3.08 g. (0.02 mole) of this alcohol in 20 ml. of 98–100% formic acid is added dropwise, the temperature being maintained below 10°, to 250 ml. of conc. sulfuric acid in a 500 ml. flask fitted with a stirrer and reflux condenser. After addition is complete, the mixture is stirred for 2 hours, poured into ice and the precipitated bicyclo[3.3.2]decane-1-carboxylic acid filtered off.

Sodium azide (0.98 g., 0.015 mole) is added in small portions over a period of 30 minutes to a stirred mixture of 2.73 g. (0.015 mole) of this acid in 50 ml. of chloroform containing 15 ml. of conc. sulfuric acid at 45–50°. A slight evolution of heat occurs. The mixture is stirred at 55° for 6 hours and ice is added to the mixture. The chloroform is removed in vacuo, the aqueous phase is made basic with 10% sodium hydroxide, and it is then extracted with ether. The ether extracts are dried and evaporated to give the title product. Addition of ethereal hydrogen chloride to a solution of the amine product in ether gives the hydrochloride salt.

EXAMPLE 2

2-aminobicyclo[3.3.2]decane

Conc. sulfuric acid (8.0 g.) is added dropwise to 1.4 g. of acetonitrile, cooled to 10–15°. To the Ritter reagent thus prepared and cooled to 10–15° is added dropwise 3.48 g. 0.0226 mole) of 6-hydroxymethylbicyclo[3.2.2]nonane. The mixture is stirred at 20° for 3 hours, cooled, and then added quickly to 60 ml. of ice cold 10% sodium hydroxide solution. The resulting mixture is extracted with benzene, and the benzene extracts washed with aqueous sodium carbonate and dried. Evaporation of the solvent gives an oil, purified by preparative gas-liquid chromatography to give 2-acetamidobicyclo[3.3.2]decane.

The purified amide (3.0 g., 0.015 mole) is refluxed with 60 ml. of conc. hydrochloric acid under nitrogen for 20 hours. A small amount of insoluble material is filtered off and the filtrate is evaporated to dryness in vacuo. The remaining traces of volatiles are removed by azeotroping with benzene. The residual oil is triturated with acetonitrile to give the hydrochloride salt of the title product. The free amine is obtained by dissolving the salt in water, making the solution basic, and extracting the basic amine with an organic solvent.

EXAMPLE 3

3-aminobicyclo[3.3.2]decane

To a solution of 11.7 g. (0.076 mole) of 3-hydroxybicyclo[3.3.2]decane in 100 ml. of dry pyridine 15.5 g. (0.081 mole) of p-toluenesulfonyl chloride is added in small batches with stirring at 0°. The mixture is then allowed to stand at room temperature overnight. The mixture is poured into water and made acidic with hydrochloric acid. The separated oil is extracted with ether, and the organic phase is washed with dilute hydrochloric acid and potassium carbonate solution and then dried. The tosylate of the starting alcohol is obtained upon evaporation.

To a solution of 15 g. (0.049 mole) of the crude tosylate in 250 ml. of dimethylacetamide, 5.2 g. (0.08 mole) of sodium azide in 21 ml. of water is added dropwise. The reaction mixture is then stirred at 90–100° for 4 hours, cooled and poured into 1 liter of water, and the azide extracted with ether. The extracts are washed with saturated sodium chloride solution and dried.

The ether solution of the azide is added to a slurry of 6.6 g. of lithium aluminum hydride in 400 ml. of ether. The mixture is refluxed for 3 hours and the hydride decomposed by means of water and 10% sodium hydroxide solution. The dried ether solvent containing the title product as the free base is treated with ethereal hydrogen chloride to give the hydrochloride, M.P. 290° dec.

EXAMPLE 4

9-aminobicyclo[3.3.2]decane

A mixture of 16.8 g. (0.1 mole) of bicyclo[3.3.1]nonane-9-carboxylic acid and 100 ml. of thionyl chloride is heated on a steam bath under anhydrous conditions until the evolution of hydrogen chloride has ceased. The excess thionyl chloride is evaporated in vacuo and the residual acid chloride treated carefully with 150 ml. of conc. ammonium hydroxide solution, with cooling. The solid which forms is filtered off, washed with water, and dried. Recrystallization from ethanol gives pure bicyclo[3.3.1]nonane-9-carboxamide.

A stirred mixture of 16.7 g. (0.1 mole) of the amide in 200 ml. of dry tetrahydrofuran and 8 g. of lithium aluminum hydride is refluxed for 24 hours under anhydrous conditions. Most of the tetrahydrofuran is removed by distillation and replaced by ether. The excess hydride is decomposed by the addition of ethyl acetate, followed by 6 N hydrochloric acid. The ethereal phase is separated and worked up to give bicyclo[3.3.1]nonane-9-methylamine. The hydrochloride is prepared by bubbling dry hydrogen chloride into an ethereal solution of this amine.

A solution of 9.49 g. (0.05 mole) of the hydrochloride of the above methylamine in 100 ml. of water is added to a 500 ml. three-necked flask set up for stream distillation. As a strong stream of steam is passed into the solution, 3 g. of sodium nitrite solution (dissolved in a small amount of water) is added, followed by 3 ml. of acetic acid. After the reaction has subsided, the reaction mixture is steam distilled until a clear filtrate results.

The distillate is extracted with ether and the ether extracts washed with dilute hydrochloric acid and aqueous sodium carbonate. After evaporation, the residue is again steam-distilled in the presence of 10 ml. of 10% sodium hydroxide. The solid 9-hydroxybicyclo[3.3.2]decane crystallizes from the distillate.

To a solution of 7.7 g. (0.05 mole) of the above alcohol in 100 ml. of dry pyridine is added 11.4 g. (0.06 mole) of p-toluenesulfonyl chloride, in batches, the solution being maintained at 0°. The resulting mixture is allowed to stand at room temperature overnight and is then poured into water containing some hydrochloric acid. The oil which separates is extracted with ether and dried. Evaporation of the solvent gives the tosylate of the above alcohol.

To a solution of 12.3 g. (0.04 mole) of the tosylate in 250 ml. of dimethylacetamide is added 5.2 g. (0.08 mole) of sodium azide in 21 ml. of water. The resulting solution is maintained at 90–100° while stirring for 4 hours. The cooled reaction mixture is poured into 5 volumes of water and then extracted with ether. The ether is dried and evaporated to give the 9-azide.

To a solution of 5.4 g. (0.03 mole) of the crude azide in 100 ml. of anhydrous ether is added a slurry of 6.6 g. of lithium aluminum hydride in 400 ml. of dry ether. The mixture is stirred and gently refluxed for 24 hours. The excess hydride is decomposed by the addition of sodium hydroxide and water and the product amine extracted with ether. The 9-aminobicyclo[3.3.2]decane is obtained upon evaporation. Addition of ethereal hydrogen chloride to an ether solution of the amine gives the hydrochloride.

EXAMPLE 5

9-(1-aminoethyl)bicyclo[3.3.2]decane

A solution of 15.4 g. (0.1 mole) of 9-hydroxybicyclo[3.3.2]decane, 11.8 g. (0.1 mole) of methylmalonic acid, and 120 ml. of acetic acid is heated for 4 hours at 70°, cooled, and poured into 1.5 liters of water. The resulting precipitate is filtered off, dissolved in 5% sodium carbonate solution, and reprecipitated with hydrochloric acid to give the intermediate 9-(1,1-dicarboxyethyl)bicyclo[3.3.2]decane. This crude malonic acid is heated in 25 ml. of pyridine at 100° for 2 hours, cooled, and poured into 200 ml. of dilute hydrochloric acid to give 9-(1-carboxyethyl)bicyclo[3.3.2]decane. This acid is converted to the title amine by the Schmidt procedure described in Example 1.

When 3-hydroxybicyclo[3.3.2]decane is substituted for the 9-hydroxybicyclo[3.3.2]decane in the above series of reactions, 3-(1-aminoethyl)bicyclo[3.3.2]decane is obtained.

EXAMPLE 6

2-(1-aminoethyl)bicyclo[3.3.2]decane

To a solution of 3.77 g. of 2-aminobicyclo[3.3.2]decane hydrochloride in 200 ml. of glacial acetic acid and 20 ml. of acetic anhydride is added 5 g. of powdered sodium nitrite. After stirring at room temperature for 8 hours, the mixture is poured into water and extracted with hexane. The hexane extracts are washed with aqueous sodium carbonate, dried, and evaporated to give 2-hydroxybicyclo[3.3.2]decane. The alcohol is then condensed with methylmalonic acid, decarboxylated, and then converted to the title amine by the procedures described in Example 5.

EXAMPLE 7

1-(1-aminoethyl)bicyclo[3.3.2]decane

Bicyclo[3.3.2]decane-1-carboxylic acid (5.38 g., 0.0295 mole) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted with ether. After drying over magnesium sulfate, the ether is removed to yield bicyclo[3.3.2]dec-1-yl methyl ketone.

To a mixture of 6.29 g. of this ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 5 minutes and then poured into an ice cold solution of 20 ml. (0.240 mole) of concentrated hydrochloric acid in 110 ml. of water. The colorless solid is filtered and washed with water. After drying over phosphorus pentoxide, the oxime of the ketone is obtained.

A solution of 4.14 g. of the oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.389 mole) of water is added dropwise, and the mixture is stirred 1 hour at room temperature. The solid is filtered and washed well with ether. The ether is dried with solid potassium hydroxide and then with magnesium sulfate, and the product 1-aminoethyl compound obtained by removal of the ether. The hydrochloride salt is obtained by bubbling dry hydrogen chloride into an ether solution of the product amine until precipitation is complete, filtering off and drying the precipitate, and then recrystallizing the salt.

EXAMPLE 8

3-dimethylaminobicyclo[3.3.2]decane 3-aminobicyclo[3.3.2]decane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether. The pure product is obtained by distillation or by conversion from a previously purified hydrochloride salt.

Substitution of the 1,2, or 9-aminobicyclo[3.3.2]decane for the 3-amino compound in the above procedure gives the corresponding 1,2, or 9-dimethylaminobicyclo[3.3.2]decanes.

EXAMPLE 9

3-methylaminobicyclo[3.3.2]decane

To a stirred solution of 125 ml. of absolute alcohol, 12.5 g. of sodium bicarbonate, and 9.5 g. of 3-aminobicyclo[3.3.2]decane hydrochloride is added 7.1 g. of methyl iodide. The mixture is warmed and maintained at a temperature sufficient to cause the evolution of carbon dioxide until the gas evolution ceases. The mixture is cooled and filtered, and the solvent evaporated. Sodium hydroxide (10%) is added to the residue, and the basic mixture extracted with ether. The ether extracts are dried and evaporated to give an oil which is distilled to give the title product.

EXAMPLE 10

1-aminomethylbicyclo[3.3.2]decane

A mixture of 9.1 g. (0.05 mole) of bicyclo[3.3.2]decane-1-carboxylic acid and 50 ml. of thionyl chloride is heated on a steam bath for 1 hour, by which time evolution of hydrogen chloride has ceased. The mixture is evaporated to dryness in vacuo and the residual acid chloride is treated with 100 ml. of conc. ammonium hydroxide, with cooling. The solid amide which forms is filtered off, washed with water, and dried.

A mixture of 4.5 g. (0.027 mole) of the amide in 100 ml. of dry tetrahydrofuran and 4 g. of lithium aluminum hydride is refluxed with stirring for 48 hours. The reaction mixture is worked up in the conventional manner to give the title amine product.

EXAMPLE 11

2-aminomethylbicyclo[3.3.2]decane

To a solution of 4.46 g. (0.029 mole) of 2-hydroxybicyclo[3.3.2]decane in 50 ml. of acetic acid is added dropwise over a period of time 3.2 g. (0.032 mole) of chromic anhydride in 2.5 ml. of water and 50 ml. of acetic anhydride, with cooling. The mixture is stirred 4 hours at room temperature, poured into water, and extracted with pentane. The pentane extracts are washed, dried, and evaporated to give bicyclo[3.3.2]decan-2-one.

A stirred suspension of 20 g. (0.0584 mole) of methoxymethyl triphenylphosphonium chloride in 100 ml. of tetrahydrofuran and 100 ml. of diglyme is treated dropwise with 52.5 ml. (.05 mole) of ethereal n-butyl lithium in a nitrogen atmosphere, and the mixture allowed to stir for 3 hours at 25°. To the resulting deep red solution is added dropwise a solution of 3.8 g. (0.025 mole) of bicyclo[3.3.2]decan-2-one in 20 ml. each of tetrahydrofuran and diglyme. After stirring for 4 hours at 25°, the tetrahydrofuran is removed by heating on the steam bath, 100 ml. of diglyme is added, and the mixture is refluxed for 7 hours. The mixture is cooled, concentrated to one-half volume in vacuo, and treated with methyl bromoacetate to remove any triphenylphosphine. After standing 12 hours, the solid is filtered off, the filtrate washed with water, and the dried organic layer evaporated to give an oil. Column chromatography over alumina gives the 2-methoxymethylene compound.

This vinyl ether is allowed to stand for 15 minutes at room temperature in a saturated solution of ether in perchloric acid, poured into aqueous sodium bicarbonate and extracted with ether. Evaporation of the dried ether extracts gives the 2-carboxaldehyde.

To a solution of 9.38 g. of hydroxylamine hydrochloride in 40 ml. of water and 40 ml. of 10% aqueous sodium hydroxide is added a solution of 4.53 g. of the 2-aldehyde in 50 ml. of 95% alcohol. The mixture is heated at 70–80° for 15 minutes, filtered hot, and then diluted with 175 ml. of cold water. The precipitate is collected and dried to give the 2-aldehyde oxime.

To a slurry of 1.75 g. of lithium aluminum hydride in 150 ml. of refluxing tetrahydrofuran is added over 20 minutes a solution of 3.85 g. of the oxime in 75 ml. of tetrahydrofuran. The mixture is heated at reflux for 3 hours, cooled, and the excess hydride decomposed by cautious addition of water. The resulting white slurry is filtered, the filter cake washed with ether, and the combined filtrates dried and evaporated to give the title 2-aminoethylbicyclo[3.3.2]decane.

I claim:
1. A compound of the formula

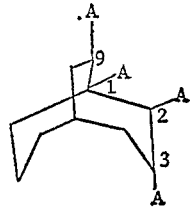

where one A group is $NH_2$, $NHCH_3$, $N(CH_3)_2$,

or $CH_2NH_2$, and the other A groups are hydrogen, or a pharmaceutically acceptable acid addition salt thereof.

2. A compound as claimed in claim 1, where the A group at the 1-position is $NH_2$, $NHCH_3$, $N(CH_3)_2$,

or $CH_2NH_2$, and the other A groups are hydrogen.

3. A compound as claimed in claim 1, where the A group at the 2-position is $NH_2$, $NHCH_3$, $N(CH_3)_2$,

or $CH_2NH_2$, and the other A groups are hydrogen.

4. A compound as claimed in claim 1, where the A group at the 3-position is $NH_2$, $NHCH_3$, $N(CH_3)_2$,

or $CH_2NH_2$, and the other A groups are hydrogen.

5. A compound as claimed in claim 1, where the A group at the 9-position is $NH_2$, $NHCH_3$, $N(CH_3)_2$,

or $CH_2NH_2$, and the other A groups are hydrogen.

6. A compound as claimed in claim 2, where A is $NH_2$, being the compound 1-aminobicyclo[3.3.2]decane, or the hydrochloride salt thereof.

7. A compound as claimed in claim 3, where A is $NH_2$, being the compound 2-aminobicyclo[3.3.2]decane, or the hydrochloride salt thereof.

8. A compound as claimed in claim 4, where A is $NH_2$, being the compound 3-aminobicyclo[3.3.2]decane, or the hydrochloride salt thereof.

9. A compound as claimed in claim 5, where A is $NH_2$, being the compound 9-aminobicyclo[3.3.2]decane, or the hydrochloride salt thereof.

10. A compound as claimed in claim 4, where A is

being the compound 3-(1-aminoethyl)bicyclo[3.3.2]decane, or the hydrochloride salt thereof.

No references cited.

CHARLES B. PARKER, *Primary Examiner.*

PATRICIA C. IVES, *Assistant Examiner.*

U.S. Cl. X.R.

260—501.1, 501.21, 514, 557, 566, 586, 999